US012024406B2

(12) United States Patent
Eiwan

(10) Patent No.: US 12,024,406 B2
(45) Date of Patent: Jul. 2, 2024

(54) CRANE AND METHOD FOR WEATHERVANING SUCH A CRANE

(71) Applicant: Liebherr-Werk Biberach GmbH, Biberach an der Riss (DE)

(72) Inventor: Christoph Eiwan, Ummendorf (DE)

(73) Assignee: Liebherr-Werk Biberach GmbH, Biberach an der Riss (DE)

( * ) Notice: Subject to any disclaimer, the term of this patent is extended or adjusted under 35 U.S.C. 154(b) by 537 days.

(21) Appl. No.: 17/314,499

(22) Filed: May 7, 2021

(65) Prior Publication Data

US 2021/0300735 A1 Sep. 30, 2021

Related U.S. Application Data

(63) Continuation of application No. PCT/EP2019/080495, filed on Nov. 7, 2019.

(30) Foreign Application Priority Data

Nov. 7, 2018 (DE) ..................... 10 2018 127 783.0

(51) Int. Cl.
*B66C 23/94* (2006.01)
*B66C 23/02* (2006.01)
*B66C 23/84* (2006.01)

(52) U.S. Cl.
CPC ............ *B66C 23/94* (2013.01); *B66C 23/022* (2013.01); *B66C 23/84* (2013.01); *B66C 2700/082* (2013.01)

(58) Field of Classification Search
CPC ........ B66C 23/84; B66C 23/94; B66C 23/022
See application file for complete search history.

(56) References Cited

U.S. PATENT DOCUMENTS 3,806,783 A * 4/1974 Lodochnikov ......... H02K 29/12 318/400.41
2009/0308827 A1* 12/2009 Philippon ............... B66C 23/88 212/294
2014/0083965 A1* 3/2014 Mayer .................... B66D 5/026 212/223

(Continued)

FOREIGN PATENT DOCUMENTS

CN 103620255 3/2014
CN 103663214 3/2014

(Continued)

*Primary Examiner* — Sang K Kim
*Assistant Examiner* — Nathaniel L Adams
(74) *Attorney, Agent, or Firm* — Levine Bagade Han LLP

(57) ABSTRACT

The present invention relates to a method for weathervaning of a crane which has a boom which can rotate about a vertical axis, a slewing gear motor and a slewing gear service brake for securing the boom in a rotational position with a securing torque in the crane mode, wherein in the case of a crane which has been out-of-operation, the boom is braked against rotation with an out-of-operation mode braking torque which is less than said securing torque in the crane mode. In this respect, the invention also relates to such a crane itself, in particular in the form of a revolving tower crane. In accordance with the invention, the out-of-operation mode braking torque is kept at least approximately constant over the range of the speed of rotation and over the range of the angle of rotation of the boom.

17 Claims, 3 Drawing Sheets

(56) References Cited

U.S. PATENT DOCUMENTS

2016/0347592 A1* 12/2016 Golder ................. H02K 49/065
2016/0362283 A1* 12/2016 Münst ..................... B66C 23/16

FOREIGN PATENT DOCUMENTS

| | | |
|---|---|---|
| CN | 106170453 | 11/2016 |
| CN | 107922173 | 4/2018 |
| DE | 102008053166 | 4/2010 |
| DE | 202014001801 | 7/2015 |
| EP | 1422188 | 2/2006 |
| EP | 2025637 | 5/2010 |
| WO | WO 2020/094770 | 5/2020 |

* cited by examiner

CRANE AND METHOD FOR WEATHERVANING SUCH A CRANE

CROSS-REFERENCE TO RELATED APPLICATIONS

This application is a continuation of International Patent Application Number PCT/EP2019/080495 filed Nov. 7, 2019, which claims priority to German Patent Application Number DE 10 2018 127 783.0 filed Nov. 7, 2018, the contents of which are incorporated herein by reference in their entireties.

BACKGROUND

The present invention relates to a method for weathervaning a crane which has a boom which can rotate about a vertical axis, a slewing gear motor and a slewing gear service brake for securing the boom in a rotational position with a securing torque in the crane mode, wherein in the case of a crane which has been out of operation, the boom is braked against rotation with a out-of-operation mode braking torque which is less than said securing torque in the crane mode. In this respect, the invention also relates to such a crane itself, in particular in the form of a revolving tower crane.

The boom in revolving tower cranes, but also in other crane types, is rotatable about an upright slewing gear axis, with a slewing gear provided for this purpose being able to have a rotary drive, for example in the form of an electric motor, whose drive movement is converted into a rotary movement of the boom via a slewing gear transmission, for example in the form of a planetary gear. In this respect, in so-called top-slewers, the boom is rotated relative to the tower supporting the boom, whereas in so-called bottom slewers, the entire tower together with the boom supported there at is rotated relative to the undercarriage or support base.

In crane operation, the rotary movements are controlled by a corresponding control of the rotary drive, with a slewing gear brake being provided for braking and also for a rotational fixing in a specific rotary position. Such slewing gear brakes can typically be configured for safety reasons such that the brake is preloaded into its braking operation position, for example by a corresponding spring device, and can be released by an adjustment actuator to release the rotatability.

In non-operation, or in the out-of-operation state when the crane is shut down, it is, however, desirable that the crane can rotate to be able to align itself with wind in the most favorable rotary position with respect to the respective wind direction. Since, for example, revolving tower cranes are typically much more stable, due to their ballast load, against tilt movements in the boom plane than in with respect to tilt movements transversely to the boom planes passing through the boom in a perpendicular manner, the crane should align itself under a strong wind such that the wind comes from behind and the boom is aligned with respect to the wind as parallel as possible with the direction of the wind since otherwise there would be a risk of a tilt of the crane or the crane would have to have additional ballast. To allow such an automatic alignment in the wind, a wind release apparatus is connectable/can be connected with the service brake or slewing gear brake and releases the brake, which is typically preloaded into its braking position, when the crane is out of operation. This "end of work" position of the slewing gear brake can be set by means of a manually actuable adjustment lever, but optionally also by a powered release drive which can move the brake actuator into a locked non-braking position before the crane is powered down. Document EP 14 22 188 B1, for example, shows such a wind release apparatus for the slewing gear brake of a revolving tower crane.

The free rotatability of the crane in the out-of-operation state can, however, result in instabilities of the crane due to self-rotation under unfavorable wind conditions. If the crane is, for example, between two buildings and only the boom or only the counter-boom is exposed to the wind, only the boom or only the counter-boom is respectively flowed against at one side by the wind, whereby the crane can be set into ever faster rotation since the crane does not come to a standstill when the boom has turned out of the wind or before the counter-boom has moved into the wind. The boom and the counter-boom can hereby alternately move into the wind so that a build-up of this cyclic wind action can result in an auto-rotation of the crane which causes the crane to rotate too fast and to tilt.

To avoid such an unwanted auto-rotation, it has already been proposed not to let the slewing gear rotate fully unbraked in the out-of-operation state, but rather to associate an additional brake with the slewing gear which admittedly allows the rotary movement of the crane under wind, but slightly brakes it to defuse the aforesaid auto-rotation problem. It has, for example, been considered to provide a light out-of-operation brake at the outlet of the slewing gear transmission which applies a limited braking torque against the crane rotation which is smaller than the torque produced by the wind action so that the crane can still align itself in the wind, but can only rotate at a low rotational speed.

Such an additional brake is, however, difficult to configure with respect to the braking torque to be equally suitable for different wind conditions and also for different crane positions. For example, too high a braking torque can have the result under a moderate wind that the crane does not align itself properly, while the same braking torque cannot sufficiently suppress said auto-rotation under very unfavorable wind conditions at high wind speeds. In addition, with revolving tower cranes having a luffable boom, the luffing position in which the crane was shut down can have an influence on the required braking torque.

In the document DE 20 2014 001 801 U1, it is proposed with regard to this issue to use the electric motor of the slewing gear drive as a slewing gear brake in the shut-down, out-of-operation state of the crane, with said electric motor permitting the rotary movements under wind, but braking them by its electromotive braking effect. This results in a braking torque being dependent on the speed that increases as the rotary speed increases, whilst during very slow rotary movements there isn't generated any or only a very low braking torque.

Further, in the document EP 20 25 637 B1, there is proposed a revolving tower crane whose service brake remains out of operation when the crane is shut down. Instead, there is activated a separate out-of-operation brake that is intended to provide a braking force equal to the wind torque on the boom reduced by the wind torque on the counter boom and reduced by a drag torque of the slewing gear. Since the lever arm or the surface exposed to the wind of the boom and also of the counter boom changes with respect to the wind direction, and in particular is at a maximum when the boom is perpendicular to the wind direction and is zero when the boom is parallel to the wind direction, the control of the brake becomes relatively complex in order to simulate such a wind torque dependent on the angle of rotation as a braking torque.

The document US 2009/0308827 A1 shows a tower crane that also has, in addition to the service brake that is put out of operation for weathervaning, an additional brake that is activated for the out-of-operation state of the crane. This additional brake is a friction disc brake, which is preloaded into the braking position by a spring device and is put out of operation by an electromagnet when the crane itself is in operation and the main service brake is engaged. In this respect, said additional brake can be adjusted with regard to its braking force by adjusting the spring preload, which drives the brake shoes against the brake disk, by means of a screw shaft. Due to the difference between the coefficient of static friction and the coefficient of sliding friction, the braking force drops significantly with increasing the speed of rotation when the crane is pulled loose or initially rotated in disturbed wind. While the braking force is relatively high at standstill, it drops sharply when the initial static friction is overcome. This makes it difficult to adjust the braking force appropriately and can hardly be compensated by the adjusting shaft for adjusting the spring device.

It is therefore the underlying object of the present invention to provide an improved crane of the initially named kind which avoids disadvantages of the prior art and further develops the latter in an advantageous manner. An auto-rotation endangering the stability of the crane should also in particular be reliably prevented for changing, difficult wind conditions and different crane configurations on the shutting down of the crane, but with a free alignment of the crane in the wind simultaneously being made possible.

SUMMARY

Said task is solved, in accordance with the invention, with a method as claimed in claim 1 and a crane as claimed in claim 3. Preferred embodiments of the invention are the subject-matter of the dependent claims.

It is therefore proposed that, when the crane is out of operation, the rotation of the boom is braked with an out-of-operation braking torque which is significantly smaller than the securing torque applied during operation, but which is also effective in the case of very slight rotations with very low speeds of rotation approaching zero. In accordance with the invention, the out-of-operation mode braking torque is kept at least approximately constant over the range of the speed of rotation and over the range of the angle of rotation of the boom. In spite of the obvious prediction that the crane would have to be braked more strongly at higher speeds of rotation and that stronger braking would be required at stronger wind torque than at low wind torque, it is sufficient to brake the boom against rotation only with a constant, small braking torque, if such a small braking torque is applied equally over the entire angle of rotation range and is also provided while the crane is still at a standstill and not rotating, in particular if the torque is at least approximately uniformly maintained when the crane starts to move freely from a standstill under disturbed wind conditions and no pull-away torque occurs. Such a uniform braking torque, in particular one that is already available when motion is initiated from the zero speed, can effectively prevent auto-rotation, even if the braking torque is very small and well below the securing torque provided during operation.

In particular, the out-of-operation mode braking torque is kept at least approximately constant even in the low speed range down to the zero speed, so that the same braking torque is provided when the crane boom is initially pulled loose under wind as when it rotates faster under disturbed wind conditions. This can prevent a pull-away effect with a stronger rotational acceleration of the boom, as occurs with disc brakes due to the different coefficients of static and sliding friction.

Said out-of-operation mode braking torque can be provided in a variety of ways, wherein, advantageously, an additional out-of-operation brake, which would be provided in addition to the service securing brake, is dispensed with. In accordance with one aspect of the present invention, said out-of-operation mode braking torque is applied by means of an adjustable torque limiting coupling, particularly in the form of a hysteresis clutch or a hysteresis brake, which may be arranged in the slewing gear drive train between the slewing gear brake and the slewing gear drive or between said drive motor and an output gear meshing with a slewing ring to which the boom or a tower supporting the boom is connected in a manner secured against rotation. If the drive train has a slewing gear transmission between the drive motor and the output gear, said torque limiting coupling can be integrated into said slewing gear transmission, in particular arranged inside the transmission housing and connectable/connected to one of the transmission elements.

In this respect, said torque limiting coupling is advantageously adjustable with regard to the torque at which slipping occurs, so that the torque limiting coupling can be switched between an operating position and an inoperative position. If the crane is in operation and the slewing gear drive train is to transmit the usual torques, the torque limiting coupling is set to a relatively high slip torque, which can at least correspond to the securing torque of said securing brake, so that slipping during crane operation per se only occurs in the event of a possible overload. On the other hand, the torque limiting coupling can be switched by a corresponding out-of-operation control apparatus into an out-of-operation position in which the torque limiting coupling provides only a very much smaller slip torque, which is in particular significantly smaller than the securing torque provided by the service brake. In this way, when the crane is out of operation, weathervaning can be achieved in which the torque limiting coupling slips, providing the desired small braking torque, which can be essentially constant over the entire range of the speed and angle of rotation range of the crane.

In particular, said torque limiting coupling is designed as a hysteresis clutch, which advantageously achieves its torque exclusively via the air gap between the rotor and the stator and does not require any friction components, so that the hysteresis clutch can provide the desired torque smoothly and with excellent torque repetition accuracy. Such a hysteresis clutch or a hysteresis brake operates wear-free and can have two segmentally permanently excited annular magnets enclosing a hysteresis disk. When like poles face each other, a maximum magnetic field acts on the hysteresis disk, causing a line of flux in the circumferential direction within the hysteresis disk and producing a maximum torque. When unequal poles face each other, the lowest magnetic field acts on the hysteresis disk and the line of flux passes directly through it, resulting in minimum torque.

Advantageously, no break loose torque occurs with such a hysteresis clutch or a hysteresis brake, and a braking torque that is largely uniform over the entire range of the speed can be achieved without wear occurring.

The hysteresis clutch or hysteresis brake could be electromagnetically configured in order to be able to adjust the amount of torque provided by electrical control. However, if the hysteresis clutch or the hysteresis brake has permanent magnets, the out-of-operation brake can also operate without a power supply.

Regardless of the electromagnetic configuration or permanent-magnetic configuration, the use of such a hysteresis clutch or a hysteresis brake can be advantageous even without adjustability of the braking torque already by the fact that no pull-away torque occurs, but the torque or braking torque is provided smoothly and approximately constantly over the entire range of the speed of interest, in particular including the low range of speed, comprising zero speed.

In a further development of the invention, said hysteresis clutch may be configured with a gap of adjustable size between the two clutch halves so that the slip torque can be adjusted by adjusting the gap size. Such an adjustable clutch gap between rotor and stator allows the torque or braking torque to be adjusted in a simple manner even if the hysteresis clutch or a hysteresis brake is of permanent-magnetic configuration.

In particular, the hysteresis clutch can have a conical gap between its clutch halves, with at least one of the clutch halves being configured to be axially adjustable so that said conical gap can be adjusted in its radial gap dimension and/or in its axial length by axially adjusting said clutch half relative to the other clutch half.

The conversion of the slip torque to a high value for regular crane operation and a lower value for the out-of-operation crane can therefore be achieved in a simple manner by an axial adjustment of one of the clutch halves.

At the same time, such an axial adjustment in conjunction with a conical gap allows the desired braking or slip torque to be set very precisely and accurately.

When using such an adjustable slip torque limiting coupling, a regular service securing brake known per se may be used, and regardless of whether such a regular service securing brake would achieve a pull-away torque per se. This is of no more significant importance since during weathervaning, said torque limiting coupling provides a much smaller slip torque, which allows the crane to rotate under a steady, relatively small braking torque.

In accordance with a further aspect of the present invention, however, said out-of-operation mode braking torque can also be provided by the service securing brake itself, in which case the conventional service securing brakes with organic brake linings are replaced by a preferably spring-actuated brake which is configured to be adjustable in its braking torque and is set by an out-of-operation control apparatus in the case of a crane which has been out of operation in such a way, that an at least approximately constant braking torque is provided which is significantly smaller than the securing torque in switched-on crane operation and is at least approximately constant over the entire range of the speed of rotation and range of the angle of rotation of the crane, i.e. also when initiating a rotating operation from the zero rotary speed. Said spring force application of the service brake can be set to a low spring force value in the case of a crane which has been out of operation, which provides the desired out-of-operation mode braking torque. In order to be able to provide the desired higher securing torque during crane mode, said spring force can be increased, for example by adjusting the spring device, and/or an additional braking force can be applied, for example by a brake actuator such as a pressure cylinder. For example, a part of a spring device can also be set out of operation in the case of a crane that has been set out of operation, for example by deactivating one or more biasing springs to provide a correspondingly smaller out-of-operation braking force.

The spring preload can be achieved, for example, by means of a mechanical spring device with, for example, disc springs or coil springs, but also by means of a hydraulic spring device with, for example, an adjustable pressure tank.

Advantageously, said slewing gear brake may have synthetic friction linings to reduce wear and provide uniform braking torque even when initiating a rotary movement from zero speed of rotation.

Said synthetic friction linings can, for example, be part of brake shoes by means of which a brake disc can be braked. Alternatively, however, the slewing gear brake can also take the form of a multi-disk brake in which said synthetic friction linings are pressed against each other in the form of discs.

For instance, the out-of-operation mode braking torque may be less than 50% of the service securing torque provided during crane mode to allow the crane to be held in a desired rotational position during operation. Such a securing torque for crane mode is usually calculated so that a wind load of 72 km/h and/or a accumulation pressure of 250 Pa from the most unfavorable direction can affect the rotating part and the maximum load and in this way it can still be held.

BRIEF DESCRIPTION OF THE DRAWINGS

The invention will be explained in more detail in the following with respect to preferred embodiments and to associated drawings. The drawings show.

DETAILED DESCRIPTION

Figure 1:
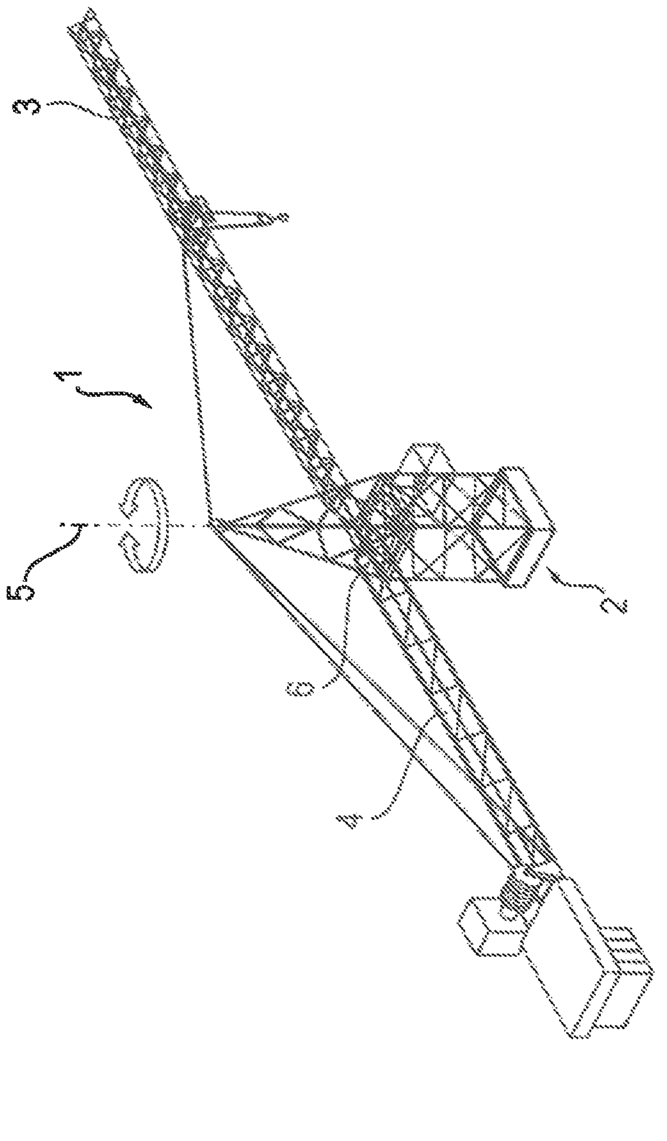
FIG. 1: a perspective, portion-wise representation of a revolving tower crane in accordance with an advantageous embodiment of the invention which is configured as a top-slewer and which has a slewing gear for rotating the boom relative to the tower.

As FIG. 1 shows, the crane forming the object can be a revolving tower crane 1 configured as a so-called top-slewer whose tower 2 supports a boom 3 and a counter-boom 4 which extend substantially horizontally and which are rotatable about the upright tower axis 5 relative to the tower 2. Instead of the crane configuration shown in FIG. 1, the revolving tower crane 1 can, however, also be configured as a bottom-slewer and/or can comprise a luffable, pointed boom and/or can be guyed via a guying with respect to the tower foot or the superstructure.

To be able to rotate the boom 3, a slowing gear 6 is provided which is provided in the embodiment shown at the upper end of the tower 2 between the boom 3 and the tower 2 and which can comprise a sprocket with which a drive wheel driven by a drive motor 7 can mesh.

An advantageous embodiment of the drive device of the slewing gear 6 can comprise an electrical drive motor 7 which can drive a drive shaft via a slewing gear transmission. Said slewing gear transmission can, for example, be a planetary gear to step the speed of the drive motor 7 up/down into a speed of the output shaft in a suitable manner.

To be able to brake rotary movements of the boom 3 in crane operation and/or to be able to maintain a rotary position of the boom 3 which has been moved to, the slewing gear 6 comprises a slewing gear service brake which can, for example, be arranged on the input side of the slewing gear transmission. The service brake can comprise, for example, in a manner known per se a frictional disk brake device or a multi-disk brake device which is preloaded into the braking position by a preloading device and which can be lifted by an electric adjustment actuator in the form of an electric magnet, for example, to release the brake. Alternatively or additionally to such a mechanical service brake, an electric-motor service brake can also be provided, for example in the form of a brake chopper having connectable braking resistances which can be integrated into or connectable/can be connected with the inverter controlling the electric motor 2.

Figure 2:
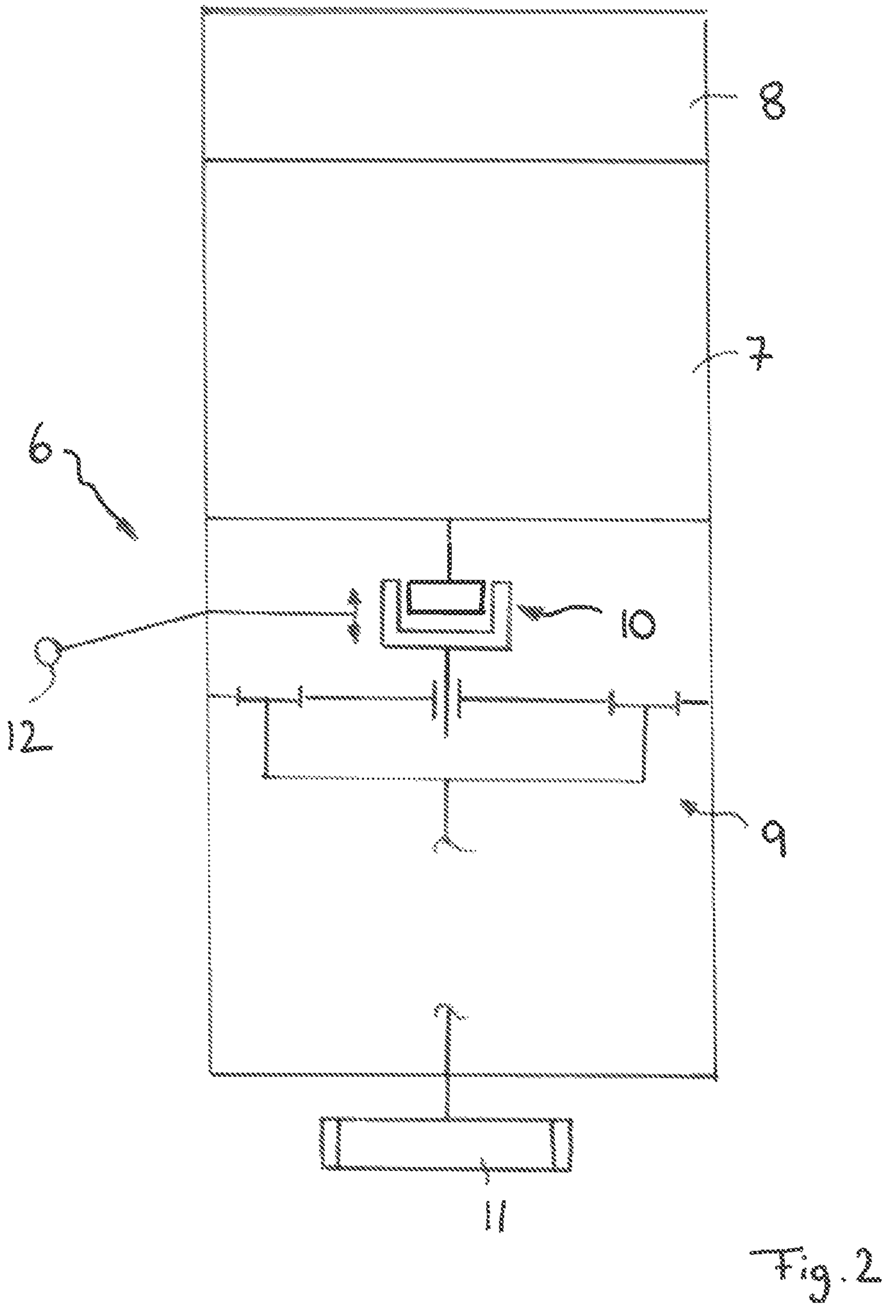
FIG. 2: a schematic representation of the slewing gear drive of the crane of FIG. 1, wherein in accordance with an advantageous embodiment of the invention an adjustable torque limiting coupling in the form of a hysteresis clutch is integrated into the slewing gear between the drive motor and the output gear.

As FIG. 2 shows, a torque limiting coupling 10 can be integrated in the slewing gear transmission 9, i.e. between the drive motor 7 and the drive gear 11, which is advantageously configured as a hysteresis clutch and is adjustable with regard to its slip torque.

Preferably, the hysteresis clutch forming the slip clutch 10 may be of cylindrical construction and/or have an internal permanent-magnetic rotor and an external hollow cylindrical hysteresis ring. Such an arrangement allows for an easy cooling of the hysteresis ring, which may be subject to considerable heating during operation.

The air gap of the hysteresis clutch may be free of oil or, advantageously, filled with oil, for example when the torque limiting coupling 10 runs in the oil bath of the slewing gear transmission. In this respect, the heat generated is dissipated via the oil bath of the transmission housing, although a separate oil circuit can also be provided.

For the purpose of possible adjustment of the slip torque of the torque limiting coupling 10, said hysteresis clutch may advantageously have an air gap which is configured to be adjustable. In the case of a cylindrical air gap, axial adjustment of at least one clutch half can be used to shorten it axially while maintaining the same radial air gap width in order to adjust the slipping torque as required.

Advantageously, however, said air gap between the clutch halves can also be conically configured in order to adjust the air gap both in its radial as well as in its axial width or length by means of an axial adjustment of at least one clutch half. By adjusting the size of the air gap, the slip torque and/or the shape or steepness of the torque/slip characteristic can be adjusted and set.

An out-of-operation control apparatus 12, shown only schematically, can perform said axial adjustment of the hysteresis adjustment to set the slip torque to the required low value well below the securing torque required in crane mode in the case of a crane which has been out of operation.

For regular crane mode, the two halves of the clutch are then adjusted axially in relation to each other again in such a way that a relatively high slip torque is provided, which can also be significantly above the securing torque of the service brake.

Figure 3:
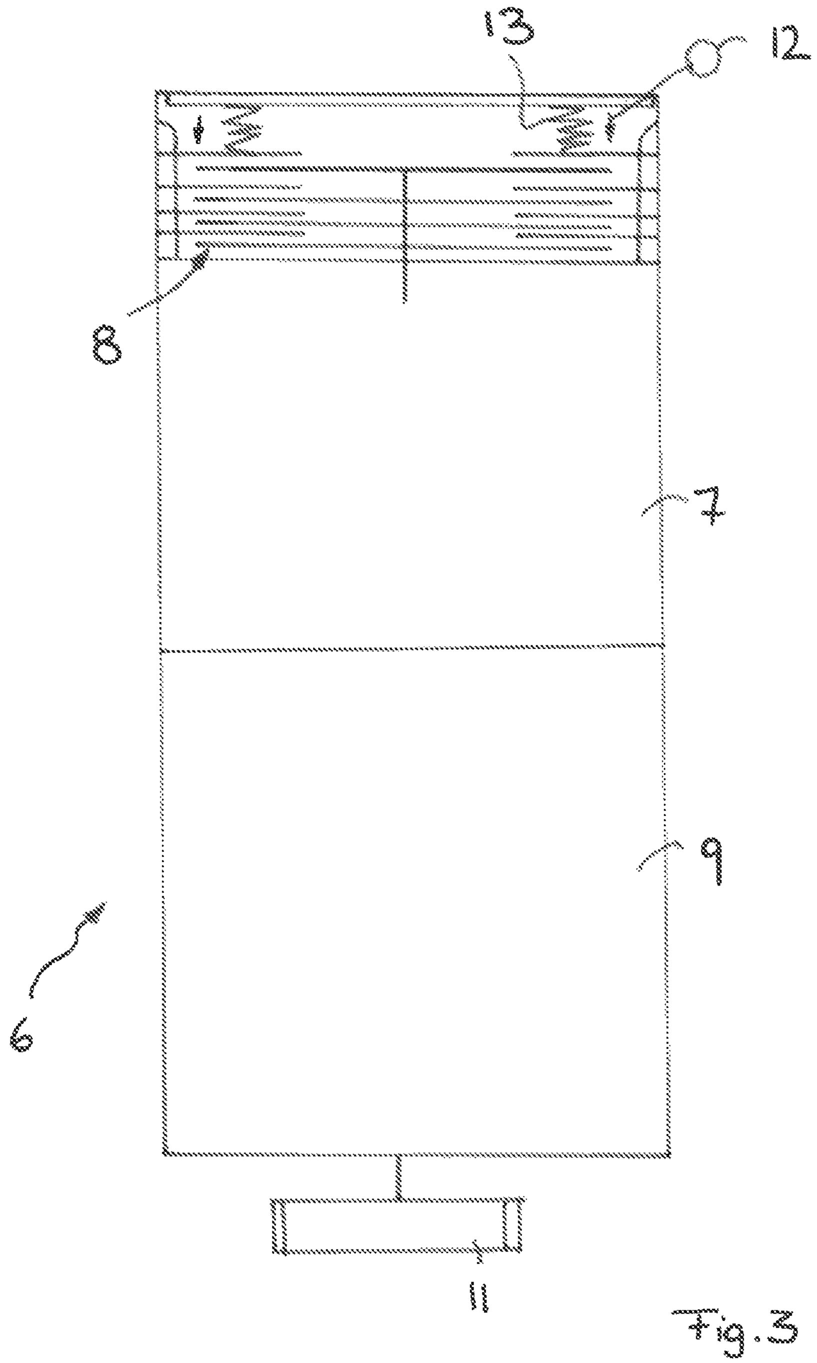
FIG. 3: a schematic representation of the slewing gear drive of the crane of FIG. 1 in accordance with an alternative embodiment of the invention, in which only one slewing gear brake is provided, which is in the form of an adjustable spring-actuated friction brake.

As FIG. 3 shows, however, the slewing gear brake 8 itself can also be used to provide a constant braking torque when the crane is shut down so that it is not pulled loose when the rotary movement is initiated. In particular, the slewing gear brake 8 can be configured to be adjustable with regard to the torque it provides.

The slewing gear brake 8 can in particular be a wheel-actuated brake that can be set to a defined braking torque, for example by the spring device 13 being configured to be adjustable for preloading the friction elements against each other.

For example, said out-of-operation control apparatus 12 can deactivate a part of the spring elements when the crane is stopped, so that when the crane is stopped, only a part of the spring elements and therefore a part of the spring preload is active. In the regular crane mode, however, all spring elements can be activated, wherein the spring device can be released or the spring preload can be overcome by a pressure medium cylinder when the slewing gear is actuated. If the air cylinder is then deactivated again, all spring elements engage and press the friction elements of the brake against each other to provide the full holding or braking force.

Advantageously, the service brake has been equipped with synthetic friction linings.

I claim:

1. A revolving tower crane comprising:
- a boom configured to rotate about a vertical axis;
- a slewing gear;
- a drive train of the slewing gear comprising:
  - a slewing gear motor for rotating the boom about the vertical axis; and
  - a slewing gear brake for braking the rotation of the boom,
- wherein the slewing gear brake is adjustably configured in its braking torque so that braking torques of different magnitudes can be provided, further comprising an out-of-operation control apparatus for adjusting the slewing gear brake to an out-of-operation mode braking torque which is smaller than a securing torque provided to a crane mode,
- wherein the slewing gear brake is configured to be spring-actuated and has a spring device adjustable in its spring force for applying braking forces of different magnitudes, and
- wherein the out-of-operation control apparatus is configured to adjust a spring preload of the spring device so that the spring device provides a lower spring force in the case of a crane that has been set out of operation compared to when the crane is in a default crane mode.

2. The revolving tower crane of claim 1, wherein the out-of-operation mode braking torque is between 5% to 50% or between 5% and 25% of the securing torque provided during the crane mode.

3. The revolving tower crane of claim 1, wherein the slewing gear brake comprises synthetic friction linings.

4. A revolving tower crane comprising:
- a boom configured to rotate about a vertical axis;
- a slewing gear;
- a drive train of the slewing gear comprising:
  - a slewing gear motor for rotating the boom about the vertical axis;
  - a slewing gear brake for braking the rotation of the boom; and
  - a torque limiting coupling comprises a hysteresis clutch between the slewing gear motor and the slewing gear brake or between the slewing gear motor and an output gear engaged with a slewing ring connected to the boom, wherein the drive train does not comprise an out-of-operation brake in addition to the slewing gear brake, wherein the slewing gear brake is preloaded into a braking position to fix a rotary position of the boom in an out-of-operation mode of the revolving tower crane, wherein the hysteresis clutch is integrated into the drive train of the slewing gear such that the hysteresis clutch transmits usual torques of the drive train when the revolving tower crane is in operation, wherein when the hysteresis clutch is switched into a crane operation mode and the crane is in operation, the hysteresis clutch provides a high slip torque which is higher than a securing torque of the slewing gear brake for support, and wherein when the hysteresis clutch is switched into an out-of-operation mode and the crane is out of operation, the hysteresis clutch provides a low slip torque smaller than the securing torque of the slewing gear brake.

5. The revolving tower crane of claim 4, wherein the hysteresis clutch is configured with a gap of adjustable size.

6. The revolving tower crane of claim 5, wherein the hysteresis clutch comprises two clutch halves, wherein the gap comprises a conical gap, and wherein at least one of the two clutch halves is configured to be axially adjustable so that the conical gap is adjusted in its radial gap dimension and/or in its axial length.

7. The revolving tower crane of claim 5, wherein the hysteresis clutch comprises two clutch halves, wherein the gap comprises a cylindrical gap, and wherein at least one of the two clutch halves is configured to be axially adjustable so that the cylindrical gap is adjusted in its axial length.

8. The revolving tower crane of claim 5, wherein the slewing gear brake comprises synthetic friction linings.

9. The revolving tower crane according to claim 4, wherein an out-of-operation control apparatus is configured to vary the torque limiting coupling between an out-of-operation position in which the torque limiting coupling provides a slip torque which is smaller than the securing torque provided by the slewing gear brake, and an in-operation position in which the torque limiting coupling provides a slip torque which is at least as large as the securing torque of the slewing gear brake.

10. The revolving tower crane of claim 9, wherein the out-of-operation control apparatus is configured to axially adjust the torque limiting coupling.

11. The revolving tower crane of claim 4, further comprising the torque limiting coupling integrated into a slewing gear transmission, wherein the torque limiting coupling is contained within a transmission housing of the slewing gear transmission.

12. The revolving tower crane according to claim 4, further comprising an out-of-operation control apparatus configured to vary the hysteresis clutch between the crane operation mode and the out-of-operation mode.

13. The revolving tower crane of claim 12, wherein the hysteresis clutch comprises two clutch halves, and wherein the out-of-operation control apparatus is configured to axially adjust one of the clutch halves.

14. The revolving tower crane of claim 4, wherein the torque limiting coupling is integrated into a slewing gear transmission and is in a transmission housing of the slewing gear transmission.

15. The revolving tower crane of claim 4, wherein the low slip torque provided during the out-of-operation mode is between 5% to 50% or between 5% and 25% of the securing torque provided during the crane mode.

16. The revolving tower crane of claim 4, wherein the slewing gear brake comprises synthetic friction linings.

17. The revolving tower crane of claim 4, wherein the slewing ring is connected to the boom in a manner secured against rotation relative to the boom.

* * * * *